No. 611,533. Patented Sept. 27, 1898.
H. M. TSCHOPP.
DISH DRAINER.
(Application filed Nov. 23, 1897.)
(No Model.)

WITNESSES:
INVENTOR
H. M. Tschopp.
BY
ATTORNEYS.

UNITED STATES PATENT OFFICE.

HENRY M. TSCHOPP, OF PICKERINGTON, OHIO.

DISH-DRAINER.

SPECIFICATION forming part of Letters Patent No. 611,533, dated September 27, 1898.

Application filed November 23, 1897. Serial No. 659,579. (No model.)

*To all whom it may concern:*

Be it known that I, HENRY M. TSCHOPP, of Pickerington, in the county of Fairfield and State of Ohio, have invented a new and Improved Dish-Drying Tray, of which the following is a full, clear, and exact description.

This invention is a dish-drying tray having a leg to support its outer portion and having a fastening device or jaw capable of engaging the edge of a pan, whereby to support the inner portion of the tray and permit the dishes to drain into the pan and to dry upon the tray.

This specification is the disclosure of one form of my invention, while the claims define the actual scope of the invention.

Reference is to be had to the accompanying drawings, forming a part of this specification, in which similar characters of reference indicate corresponding parts in all the figures.

Figure 1:
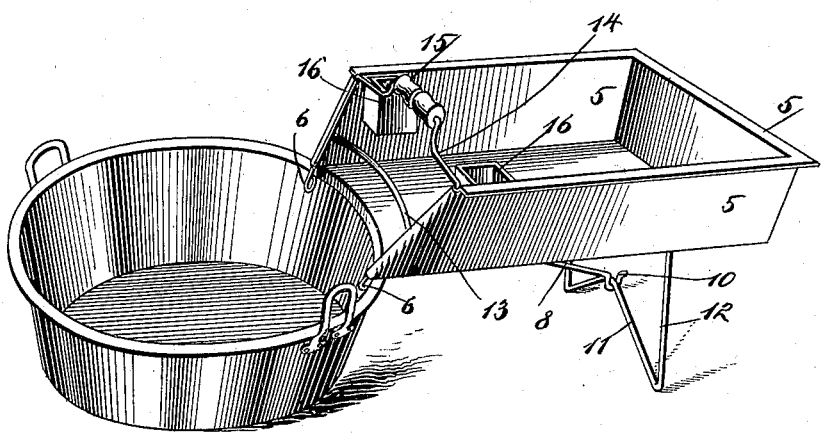
Figure 2:
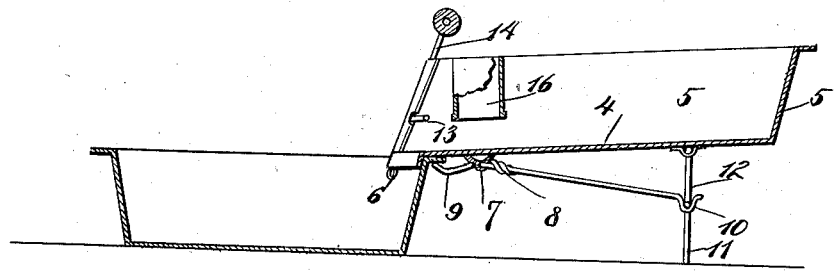
Figure 3:
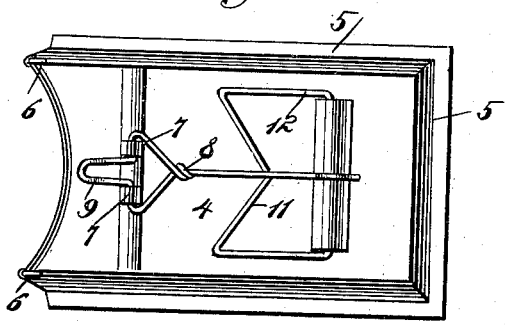

Figure 1 is a perspective view of the invention in use. Fig. 2 is a vertical longitudinal section thereof, and Fig. 3 is a bottom plan view of the invention.

The invention is adapted to be used with an ordinary pan, such as that shown in the drawings. The dish-drying tray has a bottom 4, with three sides 5, one end of the tray being open to lead to the pan. At this open or inner end of the tray two downwardly-extending projections 6 are formed, such projections being adapted to engage the inner side of the wall of the pan, at the upper edge thereof. Fulcrumed in bearings 7, secured to the bottom 4 of the tray, is a lever 8, the short arm of which is formed into a jaw 9, adapted to engage beneath the ledge of the pan, and the long arm of which lever is provided with a hook 10, adapted to engage with an angular brace 11, forming part of the leg 12, which in turn is pivoted to the bottom 4 of the tray, adjacent to the outer end thereof. When the leg 12 extends downward in operative position, the hook 10 is engaged with the brace 11, so as to hold the leg perpendicular and so also as to hold the lever in such position as to firmly engage the jaw 9 with the ledge of the pan. This securely attaches the tray to the pan and at the same time supports the tray in proper position to hold the dishes and drain the same into the pan.

The inner or open end of the tray is provided with a bar 13, which extends across said opening to prevent the dishes from falling into the pan. The service of the bar 13 is assisted by a bail 14, located above the bar 13 and approximately parallel therewith. This bail serves, therefore, the double purpose of holding dishes and of carrying the hand-grip 15, by which the tray may be manipulated. Each side of the tray carries adjacent to the inner end thereof a pocket 16, in which may be held spoons, forks, and similar articles. The dishes after being washed are laid on the tray, and the silverware is placed in the pockets 16.

According to the specific arrangement here shown the projections 6 and the bail 14 are formed of an integral length of rigid wire, the intermediate portion of which is arched over the pan to form the bail proper and the end portions of which are respectively held in the tubulated front edges of the sides 5, so that the extremities may be projected downward beyond the pan to form the projections 6.

Having thus described my invention, I claim as new and desire to secure by Letters Patent—

1. A dish-drying tray having a lever fulcrumed to the bottom thereof, one end of the lever being formed into a jaw and the other end of the lever having a hook thereon, and a leg fulcrumed to the bottom of the tray and engaging the hook of the lever whereby to hold the leg in operative position, and whereby also to hold the lever with its jaw in operative position.

2. A dish-drying tray having an open end adapted to lead to a pan, a pocket secured to the inner side of one wall of the tray, a leg pivoted to the bottom of the tray, and a lever fulcrumed to the bottom of the tray and having a hook at one end adapted to be engaged by the leg, whereby to hold the leg in operative position, and a jaw formed on the other end of the lever, such jaw being also held in operative position by the engagement of the lever with the leg.

3. A dish-drying tray having a lever fulcrumed to the bottom thereof, one end of the lever having a jaw and a leg movably mounted on the tray, the lever being capable of holding the leg in operative position, and the leg serving to hold the lever with its jaw in operative position.

HENRY M. TSCHOPP.

Witnesses:
C. O. BEALS,
P. K. HAWBECKER.